May 29, 1928.
E. G. THOMAS
1,671,261
AUTOMATIC LOCK FOR WEIGHING SCALES
Filed Sept. 13, 1924
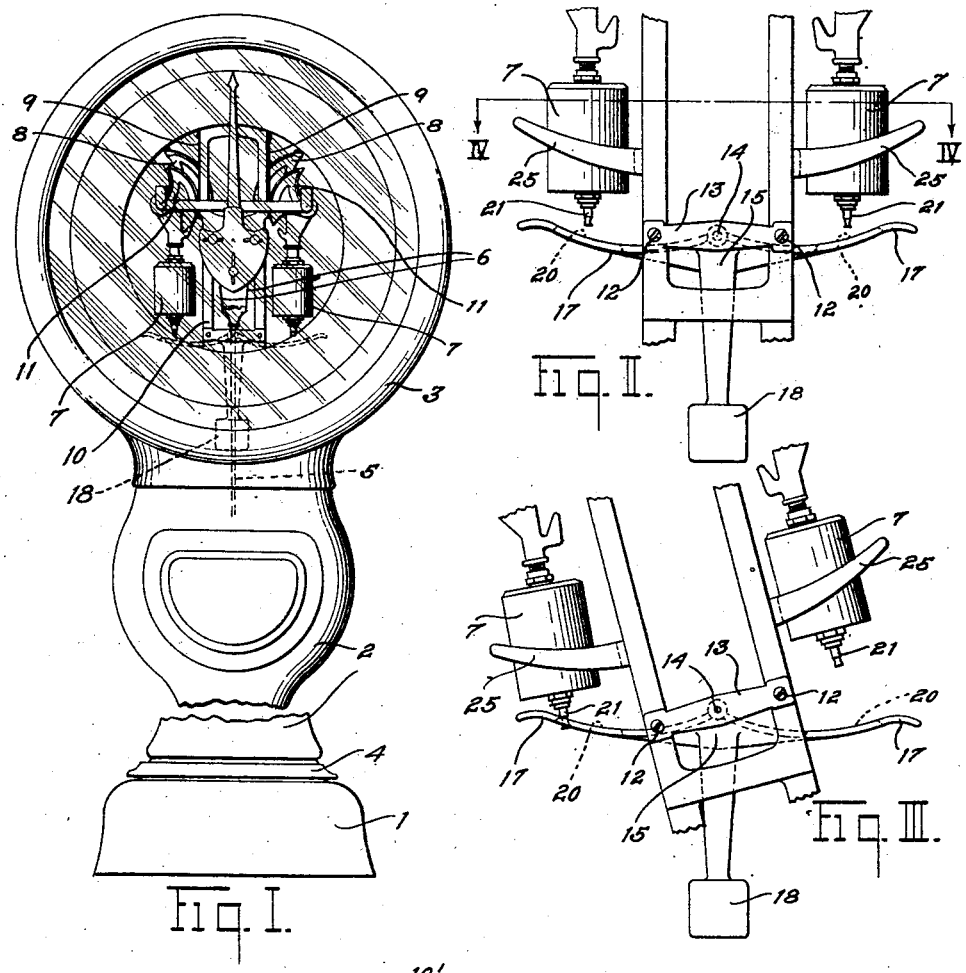
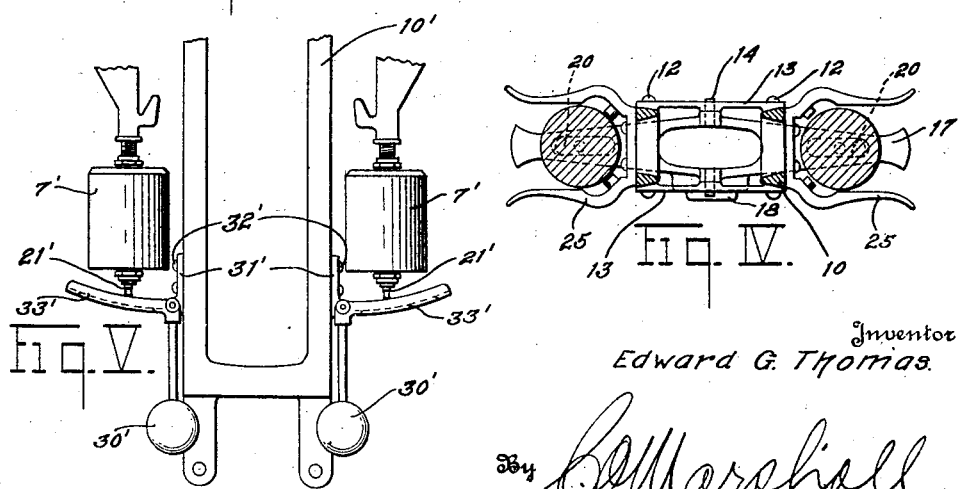
Inventor
Edward G. Thomas.
By C. M. Marshall
Attorney Patented May 29, 1928.

1,671,261

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

AUTOMATIC LOCK FOR WEIGHING SCALES.

Application filed September 13, 1924. Serial No. 737,599.

This invention relates to weighing scales of the platform type, in which the load is counterbalanced by automatically acting pendulums, and particularly to so-called person weighing scales, and one of its salient objects is the provision of reliable fool-proof locking means for preventing the pendulums from flopping about when the scale is moved from place to place.

Another object is to provide an entirely automatic means for restraining the movement and preventing displacement of the load-counterbalancing pendulums when the scale is tipped to one side.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view of a scale embodying my invention;

Figure II is an enlarged fragmentary detail elevational view of a portion of the pendulum mechanism showing the device of my invention;

Figure III is a view similar to that shown in Figure II showing the pendulum mechanism tipped and the device of my invention in an operative position;

Figure IV is a horizontal sectional view taken on the line IV—IV of Figure II showing the pendulums and locking device; and Figure V is an enlarged elevational view showing a modification of my invention.

Referring to the drawings in detail, the scale to which I have shown my device applied is of a well known type, particularly termed a person weighing scale, and consists substantially of a base 1 containing platform levers (not shown), a column 2 (the major portion of which is broken away) being supported at the rear end of the base, and a watchcase-shaped head surmounting the column 2.

The lever mechanism located in the base is operatively connected by means of a link 5 and flexible metallic ribbons 6 to power sectors 8 which form a part of the pendulum mechanism. The pendulums 7 are supported by means of flexible ribbons 9, the upper ends of which are fixed to a frame, the lower ends fixed to and adapted to overlie the curved surfaces of fulcrum sectors 11 also forming integral parts of such pendulums. When a load is placed upon the scale platform 4 supported by the base lever mechanism, the platform and link 5 are moved downwardly, causing the pendulums to move outwardly and upwardly to counterbalance such load. This type of load-counterbalancing mechanism is more particularly described in the patent to Hapgood No. 1,203,611, November 7, 1916.

Person weighing scales of this type are frequently placed outside of mercantile establishments during the daytime and taken in every night, and as the scale is moved over rough flooring, doorsills and other obstructions, the delicate load-counterbalancing pendulums and indicating mechanism are liable to become deranged. It is with the object of preventing such derangement and injury to the mechanism that I have provided means for preventing excessive movement of the pendulums from their normal or zero position when the scale is being moved or transported, such means being automatic in their operation.

Fixed to the frame 10 by means of screws 12 is a pair of cross pieces or members 13, and pivoted, as at 14, to the central portions of said cross pieces is a substantially T-shaped member 15. The member 15 is formed with comparatively thin projections or wings 17 and a pendulum 18 normally in vertical alignment with the pivot 14. The wings 17 of the member 15 are provided with longitudinal openings 20, and as the pendulum 18 always tends to assume a position in vertical alignment with its pivotal point 14, the wings 17 will therefore remain in a substantially horizontal position, the openings 20 in the wings being directly below the projections 21 fixed to the lower extremities of the load-counterbalancing pendulums 7. It will be obvious that if the scale is in its normal weighing position as illustrated in Figures I and II the load-counterbalancing pendulums are free to swing to counterbalance loads placed upon the platform. If, however, the scale be tipped to one side, the pendulums 7 and 18 tend to swing to a position of lowest center of mass, and the pendulum 18 tending to maintain the wings 17 in a horizontal position causes one of the openings 20 to receive the projection 21 of the pendulum which would normally be deranged by such tipping of the scale. The projection engaging the edge of such opening prevents further movement of the pendulum, as better illustrated in Figure III.

I have also provided means for limiting the lateral movement of the load-counterbalancing pendulums, comprising a pair of U-shaped members 25 fixedly secured to the frame 10 and adapted to loosely receive the pendulums in the normal or zero position. It will be clearly understood from the foregoing that any tendency of the pendulums to become deranged when the scale is tipped forward or backward is prevented by the members 25 and any sidewise tipping of the scale tending to derange the pendulums would be prevented by means of the wings 17, such restraining means being entirely automatic in their operation.

In the modification of my invention illustrated in Figure V, the load-counterbalancing pendulum locking means consists of a pair of auxiliary pendulums 30' which are pivoted to brackets 31' fixed to the frame 10' by means of screws 32'. The auxiliary pendulums 30' are each provided with an arm 33' having an opening to receive a projection 21' of the load-counterbalancing pendulums, the edges of said opening engaging the projection 21' of either pendulum, depending upon which direction the scale is tipped, and preventing the derangement thereof in the same manner as heretofore explained.

The embodiments of my invention herein shown and described are to be regarded as illustrative only, and it is to be understood that the invention is susceptible to variation, modification and change within the spirit and scope of the subjoined claims.

Having described my invention, I claim:

1. In a weighing scale, in combination, load-counterbalancing mechanism, and automatic means brought into action by the tipping of said scale for preventing derangement of said mechanism when said scale is tipped.

2. In a scale of the class described, in combination, pendulum mechanism, and means brought into action by the tipping of said scale for automatically preventing excessive derangement of said pendulum mechanism when said scale is tipped to an abnormal position.

3. In a device of the class described, in combination, weighing mechanism, and automatic means brought into action by the tipping of said scale for preventing derangement of said mechanism when said scale is tipped.

4. In a weighing scale, in combination, weighing mechanism, including a pendulum, a locking device for said pendulum, comprising a pendulated member, and means whereby said member is brought into engagement with said pendulum when said scale is shifted to an abnormal position.

5. In a weighing scale, in combination, load-counterbalancing mechanism comprising a pendulum, a locking device for said pendulum comprising a pendulated member, and projections on said pendulum, said pendulated member having means for engaging said pendulum when the scale is shifted to an abnormal position.

6. In a weighing scale, in combination, a frame, load-counterbalancing mechanism including a pendulum supported on said frame, and means comprising a U-shaped member embracing said pendulum for limiting fore and aft movement of said pendulum.

7. In a weighing scale, in combination, a frame, a load-counterbalancing pendulum supported on said frame, a U-shaped member for limiting fore and aft movement of the pendulum, and automatic means for limiting the lateral movement when said scale is tipped to abnormal positions.

EDWARD G. THOMAS.